United States Patent [19]

Draebel et al.

[11] Patent Number: 5,031,757
[45] Date of Patent: Jul. 16, 1991

[54] MODULAR LINK CONVEYOR SYSTEM WITH NARROW CHAIN

[75] Inventors: Jorgen Draebel, Copenhagen, Denmark; James L. Layne, Glasgow, Ky.

[73] Assignee: Span Tech Corporation, Glasgow, Ky.

[21] Appl. No.: 456,390

[22] Filed: Dec. 26, 1989

[51] Int. Cl.⁵ .............................................. B65G 17/06
[52] U.S. Cl. ..................................... 198/852; 198/841
[58] Field of Search ................ 198/831, 841, 851–853, 198/840

[56] References Cited

U.S. PATENT DOCUMENTS

| | | | |
|---|---|---|---|
| 4,222,483 | 9/1990 | Wootton et al. | 198/831 |
| 4,709,807 | 12/1987 | Poerink | 198/853 |
| 4,742,907 | 5/1988 | Palmaer | 198/852 |
| 4,765,454 | 8/1988 | Hodlewsky et al. | 198/853 |
| 4,832,187 | 4/1989 | Lapeyre | 198/853 |
| 4,893,710 | 1/1990 | Bailey et al. | 198/853 |
| 4,949,838 | 8/1990 | Lapeyre et al. | 198/853 |

*Primary Examiner*—Joseph E. Valenza
*Attorney, Agent, or Firm*—King & Schickli

[57] ABSTRACT

A conveyor system utilizing a plurality of modular links mounted by a plurality of transverse cross rods that retain the links together, forming the conveyor belt. The modular links include a plurality of apex portions, a plurality of leg portions extending therefrom and a plurality of foot portions. The apex portions include an elongated slot receiving the cross rod to allow longitudinal freedom of movement to the conveyor belt. The modular links further include side link portions that are adapted to engage conveyor guide rails integral with a support frame. Each side link portion is formed by including a depending arm having a transversely extending tab. A locking tab including resilient prongs is placed within a corresponding slot in each side link to retain the cross rod. Side rails attached to side rail brackets are provided adjacent the peripheral edges of the conveyor belt to maintain the transported product on the conveyor belt. The side rail brackets include a horizontally extending leg passing through a cross bar that supports the attached guide rails. The bore of the cross bar has grooved side surfaces to mate with ridged surfaces included on the horizontal leg of the side rail bracket. Support brackets provided at strategic positions assist in supporting the weight of the entire conveyor system. The combination of the shape of the modular links and the longitudinal freedom of movement of the conveyor allows substantially unrestricted motion through curves and bends.

26 Claims, 4 Drawing Sheets

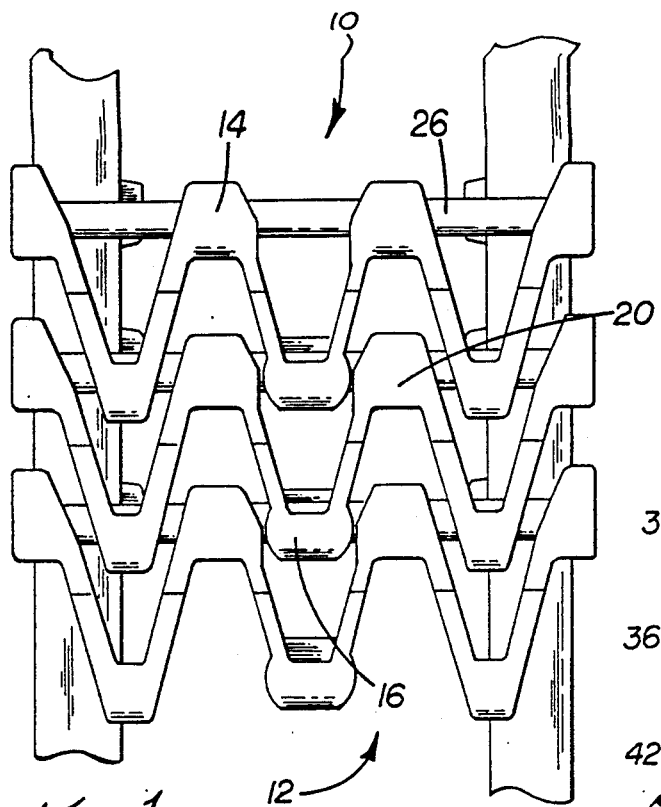
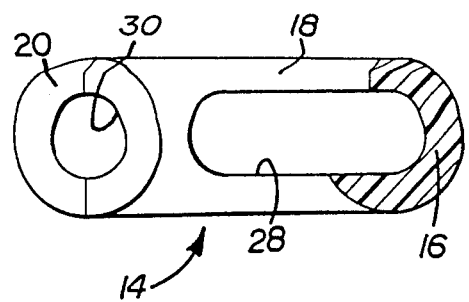
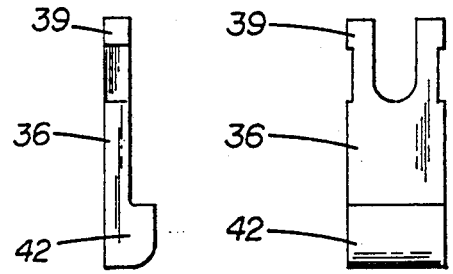
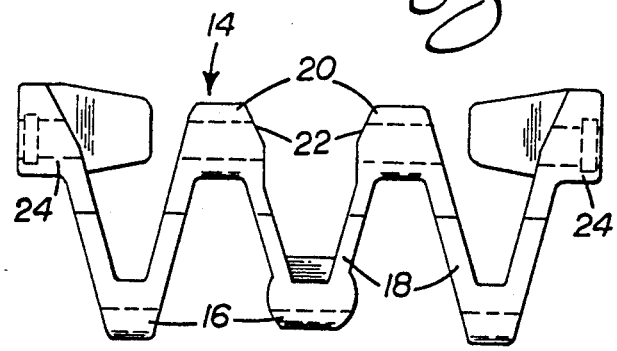
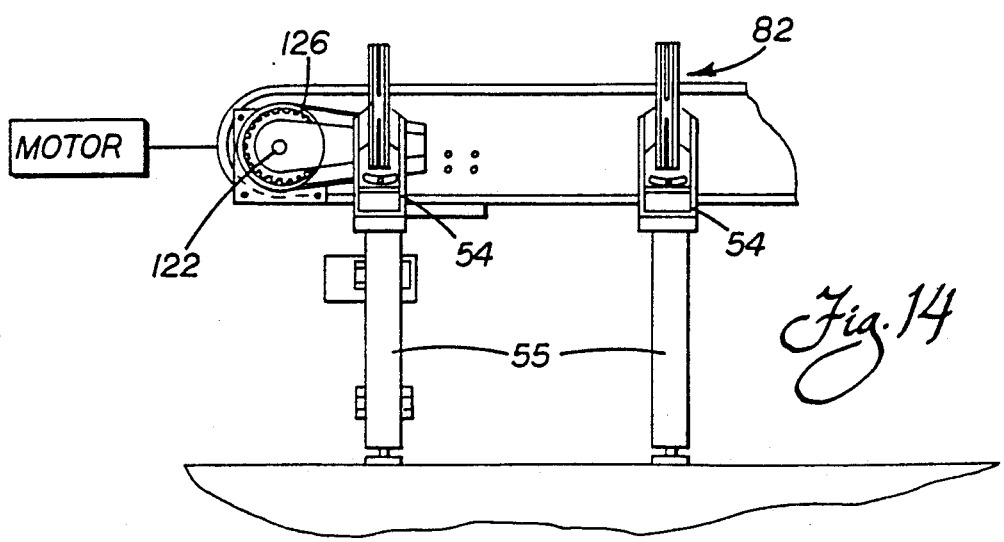

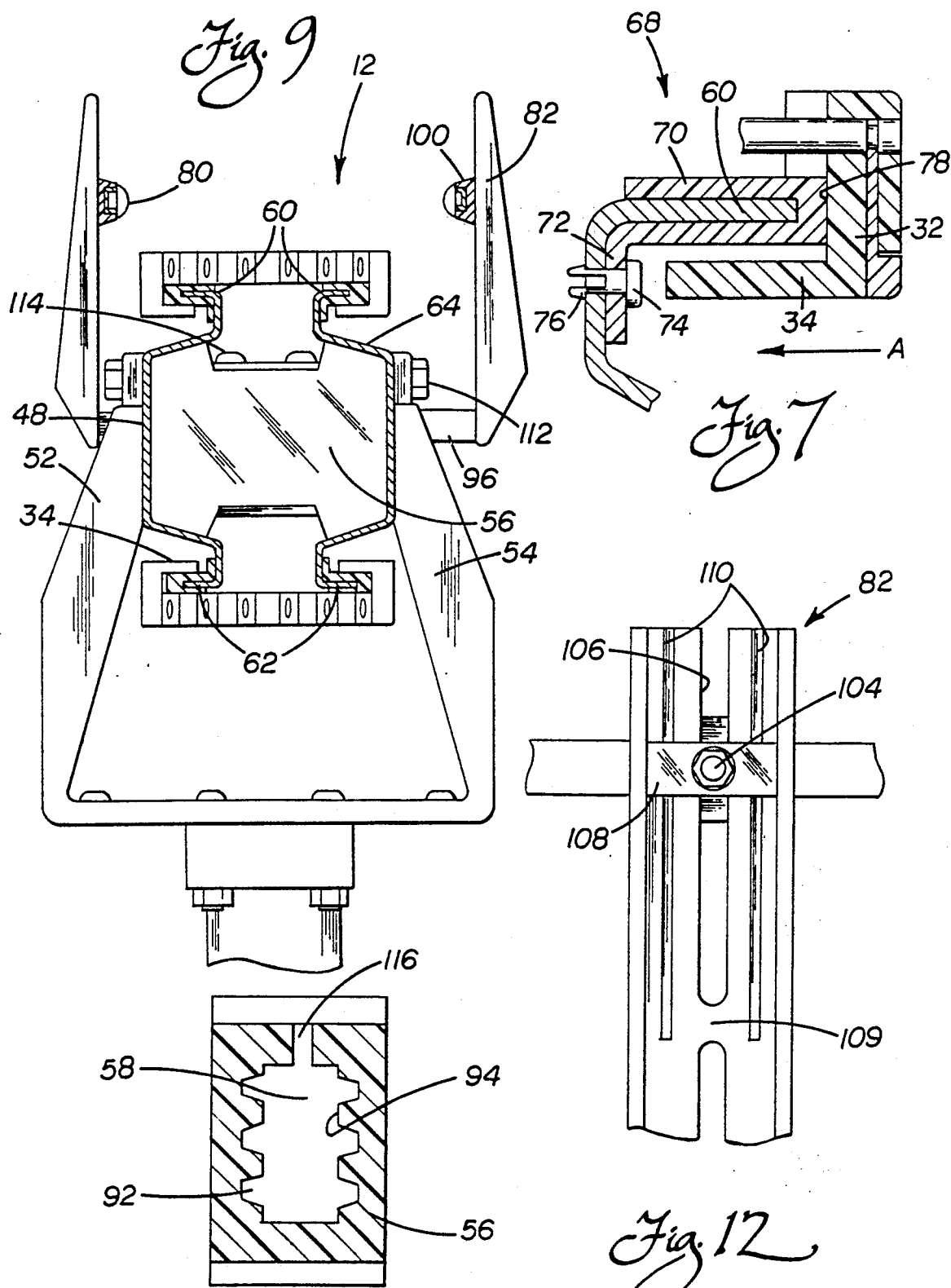

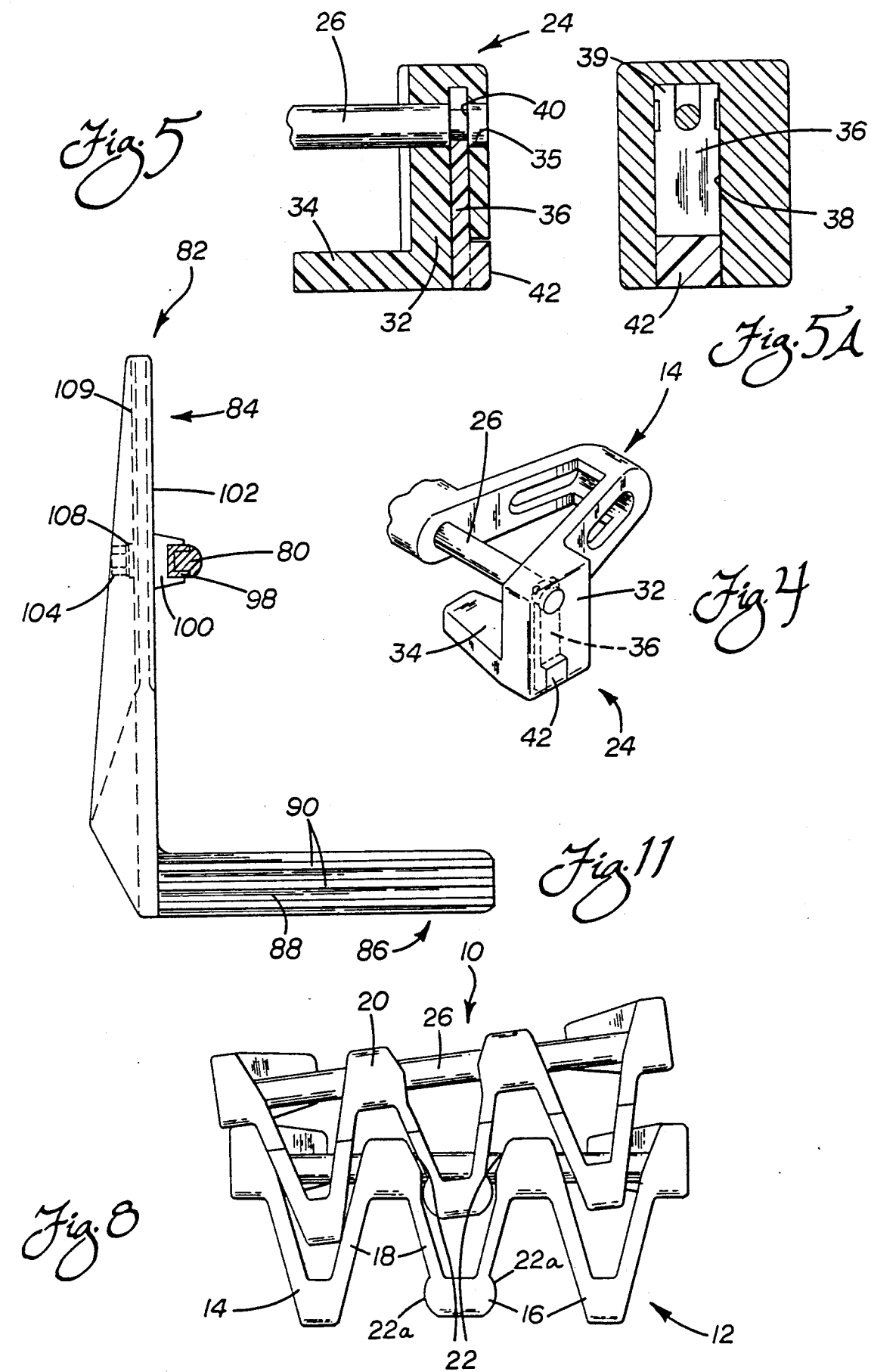

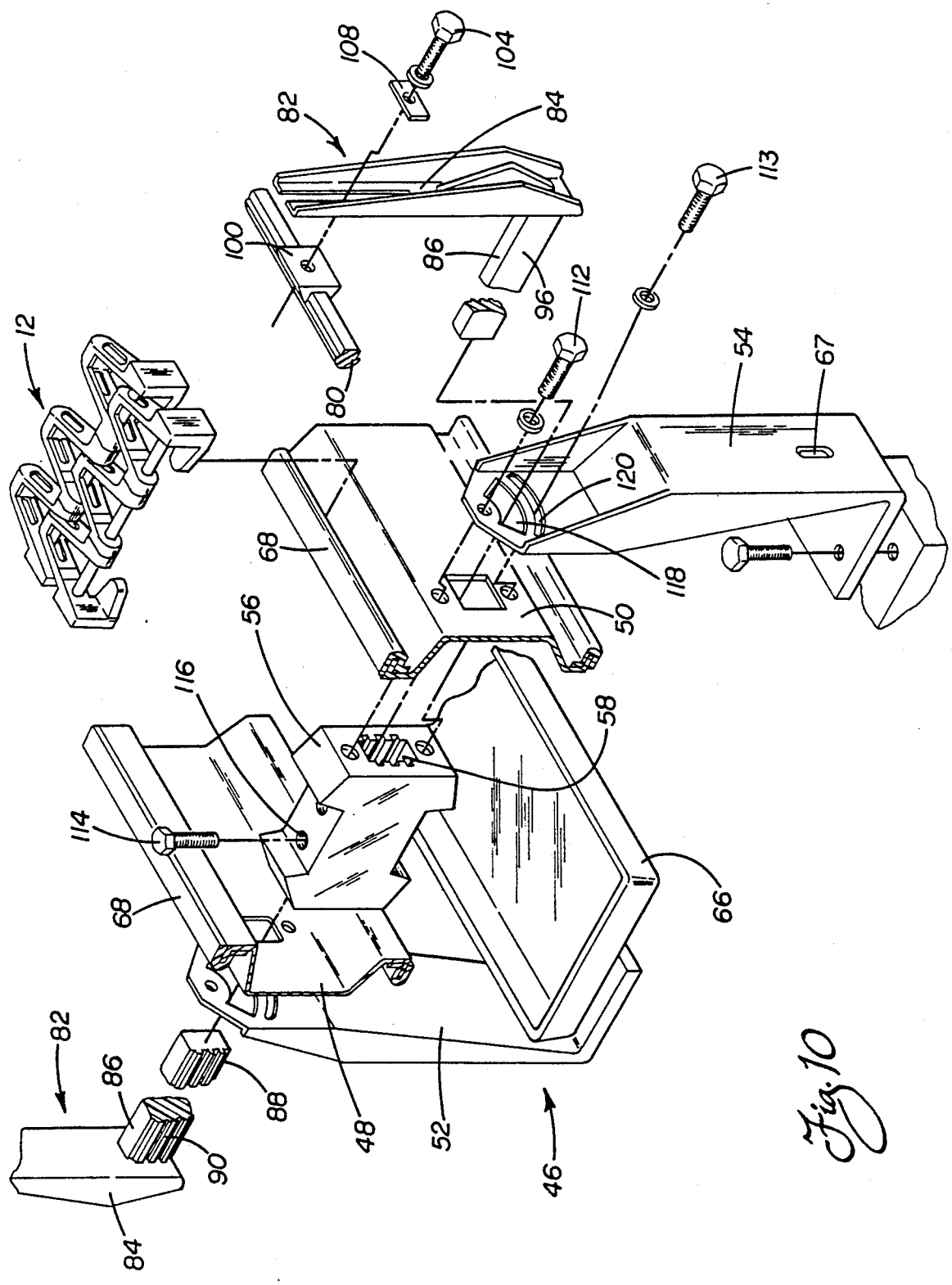

MODULAR LINK CONVEYOR SYSTEM WITH NARROW CHAIN

TECHNICAL FIELD

The present invention relates generally to conveyor systems, and more particularly, to a modular link conveyor system particularly utilized with narrow chain operation.

BACKGROUND OF THE INVENTION

Due to the rapid improvement in food processing and related technologies, conveyor systems are now an integral part of the vast majority of such operations. Automation has effected a tremendous increase in the speed of product travel on the product line from beginning to end. The speed of operation has generated a need to quickly and efficiently transport work in progress between successive work stations along the production line.

Many production facilities have focused on the more efficient use of space in an effort to reduce costs and maximize profitability. Thus, manufacturers are increasingly desirous of conveyor systems that can efficiently operate while occupying as small an area as possible. To do so there must be a capability to move product smoothly around curves as well as along extended straight runs.

It can be appreciated that providing a narrower chain width for a conveyor system presents certain problems. There is inherently less flexibility making smooth operation more difficult to achieve. This can greatly reduce the efficiency of product filling and handling operations.

There is also a need for improved product control, especially along the sides of the conveyor. As is well known in the art, side rails are commonly used to assist in this process of retaining product on the conveyor belt. A variety of means for mounting the side rails on the conveyor system have been offered. U.S. Pat. No. 3,844,405 to Shuford, issued Oct. 29, 1974, discloses laterally adjustable L-shaped brackets having horizontal tongues extending into a tubular member between the conveyor guide rails. The tongues are positioned in different horizontal planes and are locked within the tubular member by an adjustable wedge assembly. The positioning of the locking means is, however, inconvenient for effecting an adjustment of the brackets.

The same disadvantage is associated with U.S. Pat. No. 3,313,400 to Johnson, issued May 6, 1965. The mounting side rails that are laterally adjustable along an angle iron support member. The brackets are held in position solely by a bolt that is directly under the conveyor system. Both of the above described mounting means are inconvenient for operators to adjust during changeover of product.

Accordingly, a need exists to provide the conveyor system with improved means to positively retain transported items on the conveyor belt. The product retaining means would be laterally adjustable and integrated with the conveyor system so as to operate efficiently in transporting items within the narrow space provided, including around bends or corners. In addition, the conveyor system would be structurally compact in itself so as to provide maximum transport capability while saving as much space as possible for other aspects of the product handling operation. Further, the system would have an open design to facilitate removal of debris and product residue by cleaning and to allow system adjustment.

SUMMARY OF THE INVENTION

It is a primary object of the present invention to provide a modular link conveyor system capable of efficiently operating in narrow transport space.

It is still another object of the invention to provide a modular link conveyor system adapted to positively and efficiently retain transported product on the conveyor belt.

Still another object of the invention is to provide a conveyor system with side rail brackets that are laterally adjustable so as to position the associated side rails at the desired spaced width.

An additional object of the present invention is to provide a conveyor system especially adapted for food processing with all component parts having a substantially open design so as to facilitate the removal of debris and product residue by cleaning and to facilitate access for easy system adjustment.

It is a further object of the present invention to provide a conveyor system with an integrated support structure that cooperates with the product retaining means to provide firm support while aiding in the efficient transport of product through a processing facility.

Yet another object of the present invention is to provide a conveyor system capable of efficiently and reliably operating with a narrow width chain that is relatively simple and inexpensive to produce, install and maintain.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and others objects, and in accordance with the purposes of the present invention as described herein, a modular link conveyor system utilizing a narrow width chain is provided to effect smooth, continuous motion of the endless conveyor belt. The conveyor system can be used in a variety of food processing operations and the like, and is especially advantageous in operations requiring reduced space to transport product in progress between successive process stations.

The conveyor belt includes a plurality of interconnected integral modular links. The width of the conveyor belt is defined by a singular, integral link having a plurality of apex portions, a plurality of leg portions extending therefrom and a plurality of foot portions.

A plurality of transverse cross rods are provided to retain and interconnect the links together, thus forming an endless conveyor belt. The transverse cross rods are received within a transverse slot that extends from substantially near the apex portions of the links down and towards the distal ends of the leg portions. The foot portions include a transverse hole, also adapted for receiving cross rods. Each cross rod joins the foot portions of one link with the apex portions of the next succeeding link to form an endless, interlocking conveyor belt structure.

The transverse slot in the apex portions allows the cross rod to travel longitudinally between the upper inner surface of the apex portions to a position down the leg portions to substantially near the distal end of the leg portions. This provides a substantial degree of longitudinal freedom to the conveyor belt. More specifically, the provision of the slot allows the belt to compress differentially across its width. This facilitates smooth traversal of a bend by the conveyor belt. The action of the belt in traversing a corner is further enhanced by the provision of slanted surfaces on the inner faces of the foot portions. More specifically, the slanted surfaces allow the apex portions of the next adjacent link to more effectively turn in the direction of the corner.

Each modular link further includes a pair of side portions that defines the peripheral edges of the belt. The side portions advantageously fulfill the dual function of retaining the cross rods and guiding the conveyor belt during operation. The side portions include a depending arm on each side of the conveyor belt. The depending arms include a hole extending therethrough for receiving and securing the associated cross rod. Advantageously, the hole extends completely through the depending arm to its outer edge so as to facilitate the removal of food product or other residue upon cleaning. More specifically, the provision of a complete or through hole prevents the formation of a blind cavity from which removal of product is extremely difficult. As will be explained in more detail below, the depending arms assist in guiding the belt by slidingly engaging a conveyor guide rail. There is further provided on each depending arm a transversely extending tab to aid in supporting the belt as it travels in a return direction.

According to an important aspect of the invention, an integral locking tab is provided for each side portion in order to secure the cross rod in position. The locking tab includes two prongs that mate with a locking notch provided at each end of each rod. The locking tab further includes an offset release button seated in a blind slot. The inside edge of the button cooperates with an unlocking tool, such as a screwdriver, to remove the tab. The locking tab advantageously assists in retaining the cross rod in operable position within the conveyor belt while being easily removable to allow the cross rods to be withdrawn for replacement or cleaning. The removable aspect of the locking tab further assists in the complete cleaning of the conveyor system to remove product residue.

A conveyor frame is provided to support and guide the conveyor belt. The frame includes a pair of guide rails attached to a plurality of cross bars that provide spacing and support. Advantageously, the conveyor frame supports and guides the endless conveyor belt in both the feed and return directions. More specifically, upper and lower horizontally extending lips are integrally provided on the guide rails. The upper lip acts as the upper guide for the side portions as well as providing a supporting structure for the belt. The lower lip acts as a lower guide for the return of the endless conveyor belt. The transverse tabs provided on the depending arms of the side portions ride on the lower lip in the return direction. This advantageously precludes the need for any additional supporting structure for the belt return. This feature aids in reducing system complexity and also reduces the amount of space required for the conveyor system.

In order to alert the user to the need for guide replacement on the conveyor system, wear strips are provided on the lips of the conveyor guide rails. The wear strips of the present invention include a U-shaped portion to clip over the lip of the rail. A depending skirt is connected to the U-shaped portion to enhance the retention of the wear strip on the rail. There is further provided a plurality of locking members to securely retain the skirt and the guide rail together. Each locking member includes two rivets to pass through the corresponding holes of the depending skirt and the guide rail and securely retain the two together. Thus, once the locking member is installed, the wear strip is prevented from separating from the guide rail.

The locking member additionally serves as a wear indicating means for the wear strip. As will be described in more detail below, the locking member is fabricated from a material having a contrasting color to that of the wear strip. As the conveyor operates, the movement of the side link portions over the wear strip, particularly around corners, results in wear to the strip. Eventually, the wear strip is sufficiently worn for the transverse tabs of the side portions to begin to engage the locking member. As time progresses, the tabs wear through the locking member as well. When this occurs, a visual indication of wear is provided.

More specifically, when the locking member is worn, a contrasting stripe appears. This stripe is the depending leg of the wear strip showing through. Because the locking member and wear strip are of different colors, an easily recognizable visual contrast is presented. Thus, the operator is alerted to the fact that the wear strips need replacing and permanent damage is averted.

Advantageously, the visual effect generates attention to the wear strips and urges the user to inspect the wear strips immediately. Due to the simple nature of the visual inspection, it can be performed on a regular basis without a significant burden of extra time. In addition to avoiding costly permanent damage, this feature serves to dramatically increase system productivity by substantially avoiding wear related system breakdowns.

Replacement of the wear strips is also quite easy. The operator need only separate the belt and pull out the worn strip. This procedure is facilitated due to the resilient and flexible nature of the wear strip. The new strip is installed by reversing the removal procedure. Further, because the wear strip is mounted on the outside of the conveyor guide rail, installation and removal as well as visual inspection is readily accommodated.

In addition to retaining the guide rails in spaced relation, the cross bars further function to receive and support side rail brackets. The cross bar has a substantially rectangular bore extending horizontally therethrough. The full extension of the bore through the cross bar advantageously allows the horizontal legs of the side rail brackets (more fully described below) to extend completely therethrough, maximizing the support capability of the cross bar for the side rail brackets. This further allows the side rail brackets to be positioned as near to the peripheral edges of the conveyor belt as possible. In addition, the open design of the cross bar facilitates the complete passage of washing compounds to aid in the removal of any product residue. The cross bar is advantageously formulated of tough plastic material and is non-corrosive.

In an important aspect of the invention, the side surfaces of the horizontal bore of the cross bar are provided with grooves. The grooves mate with ridges on the horizontal legs of the side rail brackets to assist in their secure engagement.

Side rails attached to the brackets assist in retaining transported product on the conveyor belt. The side rails run longitudinally along the side and above the vertical plane of the surface of the conveyor belt.

The side rail brackets are positioned in pairs, one on each side of the conveyor belt at the same longitudinal position along the belt. The side rail brackets are preferably formulated of durable plastic and further are substantially "L" shaped. The lower or horizontal leg of the "L" passes through and is secured within the cross bar. Each of the pair of the side rail brackets is symmetric to the other. Thus, the lower leg of one bracket extends through and occupies substantially one half of the horizontal bore in the cross bar while the lower leg of the opposing side rail bracket passes through and occupies substantially the other half. Ridged surfaces are provided on one side of the lower leg of each side rail bracket to engage the cooperating grooved side surface of the horizontal bore in the cross bar, as described above. More specifically, the inner surface of the horizontal bore and the appropriate surfaces of the lower leg of the side rail brackets all cooperatively engage one another to provide a tight frictional fit within the cross bar to provide the appropriate support.

The upper leg of the side rail brackets includes a vertical slot extending along substantially one half the length of the upper leg. The outer surface of the upper leg of the side rail brackets includes a pair of grooves also extending substantially the length of the upper leg. These grooves mate with a lock plate designed to assist in fixing the side rails in the desired vertical position. More specifically, a locking bolt passes through the lock plate and is secured to the side rail attachment that abuts the inner surface of the upper leg. Advantageously, the lock plate substantially reduces the stresses generated in the side rail brackets by the force required to secure the side rails in position.

Advantageously, the slot in the upper leg allows the side rail to be adjusted through a substantial range of vertical positions. In addition, the slot also allows the option of providing a plurality of side rails to be used together, each at a different vertical position. This feature provides flexibility in allowing the conveyor system to transport a variety of items of different sizes and shapes.

The cooperating means of attachment between the side rails and the side rail brackets not only provides a means of retaining product on the conveyor belt, but also provides protection for the space outside the conveyor belt. More specifically, the side rail brackets do not have any mechanical attachment mechanisms protruding substantially therefrom. This not only protects operators working near the conveyor belt but also substantially facilitates continuous operation. This is accomplished by eliminating the possibility of a disruption in operation caused by engagement by the operator or another piece of equipment with a protruding part.

The conveyor system further includes floor support means at strategic positions along the conveyor assembly. The support brackets function to provide the needed support at strategic locations and further cooperate in allowing attachment of the cross bar, side rail brackets and guide rails. More specifically, the support brackets include an orifice through which the horizontal legs of the side rail brackets pass through as they are positioned within the cross bar.

The support brackets also have slots to allow the installation of a fluid collection tray below the conveyor belt. This advantageously allows fluids dripping from product being transported on the belt to be collected and carried to a central location for processing and/or disposal. Support legs mount each support bracket so that the conveyor is positioned at the proper working height.

In the preferred embodiment, an electric motor provides the driving force for the conveyor. The motor is connected by a chain to a drive shaft mounted on the conveyor frame underneath the upper conveyor belt. One or more conveyor belt engaging sprockets are placed on the drive shaft.

The sprockets may include an integral friction clutch assembly. This clutch is provided as a fail-safe mechanism. More specifically, if for some reason the conveyor belt is stopped or otherwise prevented from freely operating, the friction clutch disengages to allow the conveyor belt to idle without damage to the belt or motor.

During operation of the conveyor, the belt negotiates curves or bends smoothly with no buckling, hesitation or jumping. This is due to the free differential motion of adjacent links with respect to a common transverse cross rod. More specifically, the link configuration substantially prevents any transverse movement between the links, thereby assuring a complete "linear pivot" action. Advantageously, this linear pivoting action and guiding along the outside guide rail assures an even, continuous motion of the belt through curves. The overall conveyor system power requirements are lessened because less drag is present in the system. Therefore, the conveyor system of the present invention provides improved action of the belt around bends while simultaneously lessening the power requirements of the system.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a top plan view of a portion of the conveyor belt of the present invention;

FIG. 2 is a top plan view of the integral modular link of the present invention;

FIG. 3 is a side elevational view of the modular link of the present invention;

FIG. 4 is a perspective view of a side portion of the modular link of the present invention;

FIG. 5 is a cross sectional view of the side portion of the modular link taken along the axis of the transverse cross rod showing the locking tab fitted within;

FIG. 5A is a cross sectional view of the depending arm of the side portion of the modular link taken along the axis perpendicular to that of FIG. 5;

FIG. 6 is a front elevational view of the locking tab utilized in the present invention;

FIG. 6A is a side elevational view of the locking tab utilized in the present invention;

FIG. 7 is a partial cross sectional view of the guide rail utilized in the present invention further showing the wear strip engaging the side portion of the integral modular link;

FIG. 8 is a top plan view showing the action of the conveyor belt when rounding a bend;

FIG. 9 is a cross sectional view of the conveyor system of the present invention showing the integral belt feed and return feature of the conveyor frame and further showing the relationship between the side rail brackets, the cross bar and the support brackets;

FIG. 10 is an exploded view of the conveyor system of the present invention showing the interrelationship of the individual components;

FIG. 11 is an elevational view of the side rail bracket of the present invention showing the side rail in cross section;

FIG. 12 is a partial side elevational view of the side rail bracket of the present invention showing the bracket lock plate;

FIG. 13 is a cross sectional view of the cross bar of the present invention showing the inner ridged side surfaces of the horizontal bore; and FIG. 14 is a side elevational view of the conveyor system of the present invention.

Reference will now be made in detail to the present preferred embodiment of the invention, an example of which is illustrated in the accompanying drawing.

DETAILED DESCRIPTION OF THE DRAWING

Reference is made to FIGS. 1 and 8 illustrating conveyor belt 10 of the conveyor system 12 of the present invention. As will become apparent by reviewing the description below, the modular link conveyor belt 10 provides a smooth continuous motion even around relatively sharp bends, as illustrated in FIG. 8.

The endless conveyor belt 10 is formed by a plurality of interconnected integral modular links 14 (see FIGS. 2, 3 and 4). In the preferred embodiment, the links 14 are fabricated from high density plastic. Thus, the links are non-corrosive, strong and durable and are also easily cleaned of product residue and the like. The open design further enhances the capability of being easily cleaned. This provides a particular advantage in the food service industry where a high degree of cleanliness is desirable when handling prepared food products.

As shown in FIG. 2, each link 14 includes a plurality of apex portions 16, and a plurality of leg portions 18 extending at obtuse angles from the apex portions 16. As is further shown in FIG. 2, the leg portions 18 extending from the center apex portions 16 diverge toward the closest leg portions 18 of the adjacent apex portions 16 to form a common foot portion 20. The inner facing surfaces 22 of foot portions 20 are slanted to assist in smooth shifting operation of the conveyor belt 10 when traversing corners, as will be described in more detail below. The integral modular links 14 also include a pair of side portions 24 that assist in securing and guiding the conveyor belt 10 along both the feed and return runs of the conveyor system. The side portions 24 will be more fully described below.

A plurality of transverse cross rods 26 (see FIGS. 1 and 8) are provided to interconnect adjacent links 14. In the preferred embodiment, the cross rods 20 are also fabricated from plastic. This not only provides a strong interconnecting mechanism but in combination with the plastic integral modular links 14 maintains the non-metallic like nature of the entire conveyor belt 10. This further enhances its applicability for use in transporting certain products, such as prepared foods.

As best shown in FIG. 3, there is provided an elongated slot 28 extending from the apex portions 16 down the leg portions 18 to substantially near the foot portion 20 associated with each link 14. The slot 28 receives the cross rod 26 and allows a degree of longitudinal freedom of movement to the rod 26. This in turn allows a similar degree of longitudinal freedom of movement to the entire conveyor belt 10. This advantageously also assists the belt in traversing curves and sharp bends without buckling or jumping.

The foot portions 20 include a transverse hole 30 for receiving a cross rod 26. Thus, it can be appreciated with particular reference to FIG. 1 that the cross rods 26 join the foot portions 20 of one link 14 with the apex portions 16 of the next adjacent link 14 thereby forming the interlocking endless conveyor belt 10. The belt 10 so formed has a herringbone appearance. During operation of the belt 10 around a bend (see FIG. 8), the cross rods 26 tend to skew with respect to the longitudinal direction. The longitudinal freedom provided by the slots 28 allows the rods to skew freely and thus the belt 10 through its links 14 compresses differentially along the rods 26. This substantially eliminates jumping and buckling and assists the desired smooth motion through corners. Further, the shape of the links 14 including the slanted inner facing surfaces 22 and the cooperating surfaces 22a on the bulb-like center apex portion, prevents relative transverse link motion by maintaining close contact throughout the bend. The interaction of these mating surfaces 22, 22a substantially prevents jamming of the links 14 or rods 26 so that they quickly and properly return to the desired transverse, parallel orientation after completing a corner. Thus, it should be appreciated that the slots 28 and the slanted, cooperating facing surfaces 22, 22a operate together to allow the rods 26 to pivot linearly around bends with substantially even loading on the individual links 14, facilitating the smooth conveyor operation.

As shown in FIG. 4, the side portions 24 include a depending arm 32 for locating and guiding the conveyor belt 10 along a cooperating guide track. In addition to providing guidance for the conveyor belt 10 along the feed and return runs, the side portions 24 also assist in maintaining the cross rods 26 within the conveyor belt 10. A transversely extending tab 34 is provided on the depending arm 32 to further maintain the position of the belt 10 and retain the belt 10 on the guide track in the return direction.

The depending arm 32 further includes a hole 35 extending therethrough that is co-axial with the holes 30 of the foot portions 20. The hole 35 receives the cross rod 26, the depending arm 32 being provided with locking means to retain the rod 26 within the link 14 (see FIGS. 4 and 5).

According to an important aspect of this invention, an integral locking tab 36 is provided within side portion 32 to secure the rod 26 therein. A vertical slot 38 is provided within the depending arm 32 to receive the locking tab 36. As shown in FIGS. 4, 5 and 5A, the locking tab secures the cross rod 26 in position. As best shown in FIG. 6A, the locking tab 36 includes prongs 39 to engage a corresponding notch 40 provided at each end of each of the cross rods 26. In the preferred embodiment, the locking tab 36 is fabricated from nylon. The inherent resiliency of this material allows the prongs 39 of the tab 36 to snap lock in the notch 40 for secure engagement and further allows the locking tab 36 to be easily installed and removed.

As shown in FIG. 5, the locking tab does not project from the outer surface of the depending arm 32 of the side portion 24 The resulting smooth profile of the side portions 24 minimizes the build-up of product residue and thus facilitates conveyor system 12 cleaning.

As is best shown in FIGS. 6 and 6A, the locking tab 36 is provided with an offset release button 42 seated in the vertical slot 38. The button 42 of locking tab 36 assists in the installation and removal of the locking tab 36 from the side portion 24 when, for example, maintenance and repair is required. More specifically, a blade tool, such as a screwdriver, is tapped against the button to initiate prying action. Once sufficient movement is initiated, the screwdriver then provides increased leverage to facilitate removal of the tab 36. The inherent resiliency of the tab 36 allows the prongs 39 to disengage from the notch 40 of the cross rod 26.

To reinsert the tab 36, the prongs 39 are directed into the vertical slot 38. It can be appreciated that the resiliency of the tab 36 allows the prongs 39 to snap around the notch 40. Thus a secure engagement is provided between the locking tab 36 and the side portion 24.

A conveyor frame, generally designated by the reference numeral 46, is provided to support and guide the conveyor belt 10 (see FIG. 10). The conveyor frame 46 includes guide rails 48, 50 to engage the belt at its lateral edges. Support brackets 52, 54 support the guide rails as needed at strategic positions along the conveyor system 12 (see also FIG. 9). Support legs 55 place the conveyor system 12 at the appropriate working height.

In accordance with a further aspect of the invention, a cross bar 56 is provided to retain and secure guide rails 48, 50 in proper spaced relation. In the preferred embodiment, the cross bar 56 is fabricated of plastic to provide durability, strength and corrosion resistance. As best shown in FIG. 13, the cross bar 56 has a lateral bore 58 extending therethrough. The lateral bore 58 cooperates with additional components (as described below) to assist in maintaining product on the conveyor belt 10. The open design further facilitates cleaning, as the bore 58 allows washing compounds to flow therethrough to remove product residue that may accumulate.

As shown in FIG. 9 and according to yet another important aspect of the present invention, the guide rails 48, 50 support and guide the endless conveyor belt 10 in both the feed and return directions. As shown, upper and lower horizontally extending lips 60, 62, respectively, are provided at each side. The upper lip 60 serves a dual function. First, the upper horizontal surface provides product support. Secondly, the peripheral edge of the lip 60 engages arms 32 of side portions 24 to laterally guide the belt 10 (see also FIG. 7).

The conveyor belt 10 is supported in the return direction by the lower lip 62 engaging the tabs 34 on the side portions 24 of the links 14. Thus, the conveyor frame 46 advantageously supports and guides the conveyor belt 10 in both the feed and return directions without additional supporting hardware as required by many of the prior art systems. This results in reduced equipment costs as well as simplified installation.

The frame 46 also is designed to minimize the build-up of product residue and simplify cleaning as much as possible. In particular, it should be appreciated that the arms 32 and the tabs 34 ride on the outside of the frame 46 where they can be easily inspected and cleaned. Further, frame portions 64 just below the upper lip 60 slope downwardly. This serves to facilitate liquid run-off and prevent the settling of residue. This run-off may be collected in a fluid collecting tray 66 provided below the conveyor belt 10, as shown in FIG. 10. The support brackets 52, 54 include slots 67 to assist in positioning and supporting the fluid collecting tray 66.

According to still another important aspect of the present invention, wear strips 68 are utilized to provide a low friction surface upon which the surfaces of the conveyor belt 10 may freely slide. As best shown in FIG. 7, the wear strips 68 include a substantially U-shaped guide rail engaging portion 70 for releasably engaging the horizontal lips 60, 62. Advantageously, the sides of the engaging portions 70 are not quite parallel but extend towards one another at a small angle (not shown). This slight interference angle coupled with the inherent resiliency of the wear strip material assures a secure, tight fit of the engaging portion 70 on the lips 60, 62.

As further shown in FIG. 7, a depending skirt 72 extends from the engaging portion 70 of the wear strip 68. The skirt 72 cooperates with a locking member 74 as a means for securely fastening the wear strip 68 to the guide rails 48, 50. A pair of rivets 76 is integral with the locking member 74 and serves to fasten the skirt to the guide rails 48, 50. Thus, the locking member/rivet combinations 74, 76 securely retain the wear strip 68 on the guide rails 48, 50.

The locking member 74 additionally serves as a wear indicating means for the wear strip 68. During operation of the conveyor system 12, the wear strips 68 eventually become worn. The wearing action is greatest around bends, as the depending arms 32 of the side portions 24 are forced into engagement with the outer face 78 of the U-shaped engaging portion 70 on the outside rail so as to effect the desired turning. After the wear reaches a certain extent, it becomes necessary to replace the wear strips 68 to assure the desired low friction, smooth operation of the conveyor system 12. As the outer face 78 of the wear strip 68 becomes increasingly worn, the thickness of the face 78 is reduced. Thus, the depending arms 32 of the side portions 24 will move in the direction of action arrow A until they eventually contact the surface of the locking member 74 (see FIG. 7). The surface of the member 74 begins to wear accordingly. Eventually, a portion of the entire length of the locking member 74 wears through.

By the provision of the member 74 and the skirt 72 of sharply contrasting colors, a dramatic visual image is presented. More specifically, after the surface of the locking member 74 has worn through to the underlying skirt 72, a "stripe" appears. Being of a contrasting color, this stripe is readily apparent to the operator. Advantageously, since the wear strip 68 is placed on the outside of the guide rails 48, 50, the visual inspection for wear is quite readily accomplished.

In order to determine when the wear strip 68 must be replaced, the operator simply visually scans the rails 48, 50. Any wear strips 68 requiring replacement are readily identifiable. Advantageously, the visual inspection can be quickly accomplished and thus can be performed as often as desired, such as before each operating shift. Further, because the wear strips 68 face outwardly, they may be relatively simply and quickly replaced. Thus, productivity is effectively increased by providing a system for readily identifying when maintenance is required, as well as a system wherein down time for that maintenance is reduced.

To improve the efficient operation of the conveyor system 12, one or more pairs of plastic side rails 80 are provided in longitudinal orientation on opposing sides of the conveyor system 12 to assist in retaining product on the conveyor belt 10. The narrow width belt can thus convey narrow product and maneuver in the reduced spaces available in many present food processing facilities. A plurality of side rail brackets 82 are provided to support and position the side rails 80. As shown in FIG. 11, the side rail brackets 82 include a vertically extending leg 84 adapted to receive and position the side rails and a horizontally extending leg 86 that cooperates with cross bar 56 to provide firm support. As can be appreciated by reference to FIGS. 10 and 11, the side rail brackets 82 are substantially L-shaped. In the preferred embodiment, the side rail brackets 82 are fabricated of plastic to maintain the high quality of the conveyor system 12 while retaining the desired strength needed to resist normally expected forces. In addition, the side rail brackets 82 being of plastic, are non-corrosive and as with the other components previously described, are easily cleaned.

The side rail brackets 82 are mounted on the conveyor frame 46 in cooperating pairs; that is, two side rail brackets 82 are positioned directly opposite each other on opposite sides of the conveyor frame 46 at strategic locations along the conveyor system 12. Advantageously, the brackets 82 are symmetrical so that they are interchangeable between opposing sides of the conveyor frame 46.

The outer surface 88 of the horizontally extending leg 86 (as referenced to its seated position within the lateral bore 58) includes a plurality of ridges 90 that mate with grooves 92 on the side surfaces 94 of the lateral bore 58 (see FIG. 13). The inner surface 96 (see FIG. 9) of each horizontally extending leg 86 has a smooth face that further assists in mounting and stabilizing the brackets 82. These two smooth surfaces cooperate back-to-back creating the firm and tight supporting engagement needed for the desired result.

With reference again to FIG. 11, the side rail 80 is held within jacket 98 forming a part of mount 100. The mount 100 engages the inner face 102 of the vertically extending leg 84 and is secured thereto by bolt 104 that extends through vertical slot 106 in vertically extending leg 84 (see FIG. 12). Advantageously, a lock plate 108 is provided to be positioned between the bolt 104 and the outer face 109 of leg 84 to distribute the forces generated by tightening the mount 100 on the bracket 82. Lock plate 108 includes a pair of notches (not shown) that mate with vertical grooves 110 in the outer face 109 of vertical leg 84 (see FIG. 12). Lock plate 108 thus advantageously allows the side rail 80 to be very tightly secured to side rail brackets 82 while minimizing the chance of structurally damaging the bracket 82.

The vertical slot 106 extends from the top of leg 84 a distance substantially half way down. Thus, it can be appreciated that the position of side rail 80 can be adjusted through a broad vertical range along the slot 106. Accordingly, the conveyor system 12 can transport and feed products of varying heights. This is important since the vertical position of the side rail 80 in relation to the center of mass of the product is very critical.

It can be further appreciated that the broad vertical range provided by slot 106 allows the option of simultaneously attaching a plurality of side rails 80 to the brackets 82 at different vertical positions. This feature can be particularly desirable when the conveyor system 12 is simultaneously transporting different products of varying heights.

Similarly, it can be appreciated that the side rail brackets 82 may be positioned over a broad range of lateral (horizontal) positions. This range of positions is determined by the extent to which the horizontally extending legs 84 are inserted into cross bar 56. The ridged outer leg surfaces 88 securely engage the grooved side surfaces 94 of the lateral bore 58 to form a tight fit within the lateral bore 58. To further enhance the support capability of the side rail brackets, the smooth face inner leg surfaces 96 of opposing brackets 82 tightly and frictionally engage each other to assist in providing a firm support for the side rails 80.

Advantageously, once the side rails 82 are set to the desired spaced width through lateral adjustment, the operator can secure set screws 114 in threaded holes 116 in the cross bar 56 to provide additional security to the firm position of the side rail brackets 82. This operation is easily accommodated due to the open design provided by the links 14. Thus, as best shown in FIGS. 9 and 10, the support brackets 52, 54, guide rails 48, 50, cross bar 56 and side rail 80 on side rail brackets 82 integrally cooperate to provide the desired support for product on the conveyor system 12. The support brackets 52, 54, guide rails 48, 50 and cross bar 56 are secure together by upper and lower bolts 112, 113, respectively.

As is shown in FIG. 10, the support brackets 52, 54 may be provided with apertures formed as arcs to assist in allowing the conveyor system 12 to operate through changes in grade elevation. The aperture 118 allows the horizontally extending legs 86 to be installed and operated in the inclined orientation. In addition, arc slot 120 may be provided to cooperatively allow a like degree of angular freedom for lower bolt 113.

In the preferred embodiment and as shown in FIG. 14, an electric motor provides the driving force for the conveyor belt. The motor with drive shaft 122 rotates the driving sprocket 126. Thus, the drive shaft rotary motion is transmitted to the conveyor belt 10.

The belt engaging sprockets 126 may include an integral friction clutch assembly (not shown). The clutch is provided as a failsafe mechanism. More specifically, if for some reason the conveyor belt 10 is stopped or otherwise prevented from freely operating, the friction clutch disengages to allow the conveyor belt 10 to idle without damage to the belt 10 or motor.

In summary, numerous benefits have been described which result from employing the concepts of the present invention. The conveyor system 12 includes an endless conveyor belt 10 exhibiting smooth, continuous operation even when traversing relatively sharp bends. The side portions 24 of the modular links 14 fulfill the dual function of guiding the conveyor belt 10 and securely retaining the cross rods 26 to reliably form the endless conveyor belt 10. The conveyor frame 46 includes two guide rails 48, 50 to guide and support the conveyor belt 10 in both the feed and return directions. Advantageously, this simplifies installation and reduces overall space requirements, system complexity and cost.

The wear strips 68 provide a low friction surface upon which the conveyor belt 10 rides. The locking member 74 helps securely retain the wear strip 68 and provide a visual indication of wear. One or more side rails 80 is provided to positively retain product on the conveyor belt 10. The side rails 80 are securely attached to side rail brackets 82. The side rail brackets 82 are substantially prevented from lateral movement by the tight engagement of the ridged outer surfaces 88 of horizontally extending legs 86 with the grooved side surfaces 94 within the lateral bore 58. Further support against lateral movement is provided by the smooth faced inner surfaces of the horizontally extending legs 86 frictionally engaging each other.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

What is claimed is:

1. A modular link conveyor system, including a belt mounted on conveyor guide means, comprising:
   a plurality of integral modular links, each link including a plurality of apex portions and a plurality of leg portions extending therefrom, said apex portions further including a slot passing transversely therethrough, said leg portions further terminating in foot portions, each said foot portion including a hole passing transversely therethrough;
   a plurality of transverse connecting means, said connecting means passing through said slots and said holes to engage said integral modular links together and form a conveyor belt;
   said integral modular links including side portions formed by the inclusion of a depending arm to said integral modular links for engaging said conveyor guide means, and each said side portion further including integral locking means for engaging said connecting means.

2. The conveyor system of claim 1 wherein said depending arm includes an inwardly extending transverse tab.

3. The conveyor system of claim 1 wherein said conveyor guide means includes a pair of guide rails.

4. The conveyor system of claim 3 wherein said guide rails include an upper and lower lip for guiding said conveyor belt, said lower lip slidingly engaging said transverse tab on said side links to provide an integral belt return.

5. The conveyor system of claim 4 wherein said guide rails further include conveyor wear strip means for relatively low friction sliding engagement with said conveyor belt, said wear strip means including wear indicating means.

6. The conveyor system of claim 1 wherein said locking means includes a locking tab, and a slot within said side portions for receiving said tab.

7. The conveyor system of claim 6 wherein said locking tab is positioned inside of said side link portion so as not to protrude outside the periphery of said conveyor belt.

8. The conveyor system of claim 7 wherein said locking tab further includes an offset release button for cooperating with an unlocking tool to assist in the removal of said locking tab.

9. The conveyor system of claim 1 wherein said conveyor system includes support brackets attached to said conveyor guide means.

10. The conveyor system of claim 9 wherein said support brackets include an aperture forming an arc for receiving attachment means.

11. The conveyor system of claim 10 wherein said support brackets further include a slot for receiving a fluid connecting tray.

12. The conveyor system of claim 1 wherein is further provided product retaining means including a plurality of side rails.

13. The conveyor system of claim 12 Wherein said product retaining means further includes a plurality of laterally adjustable brackets, each of said brackets having a vertically projecting leg and a horizontally projecting leg so as to be substantially "L" shaped.

14. The conveyor system of claim 13 wherein said vertically projecting legs include a slot, said slot receiving attaching means for one or more of said side rails.

15. The conveyor system of claim 14 wherein said side rail attaching means includes a side rail engaging member positioned on a face of said vertical projecting leg of said bracket facing said conveyor belt and a lock plate positioned on a face of said vertically projecting leg facing away from said conveyor belt, said side rail engaging member and said lock plate cooperatively connected.

16. The conveyor system of claim 13 wherein sad horizontally projecting leg includes a substantially flat inner face and an outer face including a plurality of ridges.

17. The conveyor system of claim 16 wherein is provided a plurality of longitudinally aligned cross bars placed underneath said conveyor belt for receiving said horizontal legs.

18. The conveyor system of claim 17 wherein said horizontal leg is received in an open bore of said cross bar aligned between said brackets.

19. The conveyor system of claim 18 wherein said bore includes grooved side surfaces to cooperatively receive ridged faces of said horizontally projecting legs so as to maintain tight frictional support for said product retaining means while allowing for lateral adjustment.

20. The conveyor system of claim 1 wherein is provided drive means including at least one sprocket for engaging said modular links and a means for driving said sprocket.

21. An endless conveyor belt, comprising:
   a plurality of integral modular links, each of said links including a plurality of apex portions and a plurality of leg portions extending therefrom, said apex portions further including a slot passing transversely therethrough, said leg portions further terminating in foot portions, each said foot portion including a hole passing transversely therethrough;
   a plurality of transverse connecting means for engaging said integral modular links by passing through said slots and said holes and holding said links together so as to form an endless conveyor belt; and said integral modular links including a plurality of side portions, said side portions including a depending arm for guiding each said side portion, said side portions further including integral locking means for engaging said connecting means.

22. The conveyor belt of claim 21 wherein said locking means includes a locking tab received with a corresponding slot in side links.

23. The conveyor belt of claim 22 wherein said locking tab is positioned inside of said side link portion so as not to protrude outside of the periphery of said conveyor belt.

24. The conveyor belt of claim 23 wherein said locking tab further includes an offset release button for cooperating with an unlocking tool to assist in the removal of said locking tab.

25. The conveyor belt of claim 21 wherein said depending arm of said side portions further includes a transversely extending tab.

26. The conveyor belt of claim 21 wherein the said apex and foot portions include relatively slanted side surfaces to allow cooperating engagement with the leg portions of an adjacent link so as to facilitate travel around bends.

* * * * *